US007995858B2

(12) United States Patent
Bekiares et al.

(10) Patent No.: US 7,995,858 B2
(45) Date of Patent: Aug. 9, 2011

(54) METHOD AND APPARATUS TO FACILITATE CREATING ANCILLARY INFORMATION REGARDING ERRORED IMAGE CONTENT

(75) Inventors: Tyrone D. Bekiares, Chicago, IL (US); Faisal Ishtiaq, Chicago, IL (US); Raghavan Subramaniyan, Bangalore (IN)

(73) Assignee: Motorola Solutions, Inc., Schaumburg, IL (US)

( * ) Notice: Subject to any disclaimer, the term of this patent is extended or adjusted under 35 U.S.C. 154(b) by 1007 days.

(21) Appl. No.: 11/773,680

(22) Filed: Jul. 5, 2007

(65) Prior Publication Data

US 2009/0010564 A1 Jan. 8, 2009

(51) Int. Cl.
*G06K 9/40* (2006.01)
(52) U.S. Cl. .................. 382/275; 382/248; 382/250
(58) Field of Classification Search .................. 382/248, 382/250, 274
See application file for complete search history.

(56) References Cited

U.S. PATENT DOCUMENTS

| | | | |
|---|---|---|---|
| 5,442,400 A * | 8/1995 | Sun et al. .................. | 375/240.15 |
| 5,737,022 A * | 4/1998 | Yamaguchi et al. ..... | 375/240.15 |
| 6,285,715 B1 * | 9/2001 | Ozcelik et al. ........... | 375/240.27 |
| 6,489,996 B1 | 12/2002 | Matsumura | |
| 6,983,016 B2 * | 1/2006 | Hourunranta ............ | 375/240.12 |
| 2003/0011679 A1 * | 1/2003 | Jung et al. .................... | 348/181 |
| 2004/0146209 A1 | 7/2004 | Kadowaki | |

FOREIGN PATENT DOCUMENTS

| | | |
|---|---|---|
| EP | 1137005 A | 9/2001 |
| EP | 1505838 A | 2/2005 |

* cited by examiner

*Primary Examiner* — Bhavesh M Mehta
*Assistant Examiner* — Stephen R Koziol
(74) *Attorney, Agent, or Firm* — Valerie M. Davis

(57) ABSTRACT

Pixels in a provided image for which the content has been provided in error are identified. This image content is processed to provide a version of the image wherein the error is at least partially concealed while also creating ancillary information regarding the errored pixel(s) and the spatial location to which such pixel(s) corresponds to thereby provide a record that describes which pixels in the image content were provided in error. An optional user-selectable option can permit displaying either of the aforementioned corrected version of the image wherein the error is at least partially concealed and a version of the image wherein the ancillary information is used to depict the errored pixel(s) such that provided-in-error pixels are readily distinguished from correctly-provided pixels.

16 Claims, 2 Drawing Sheets

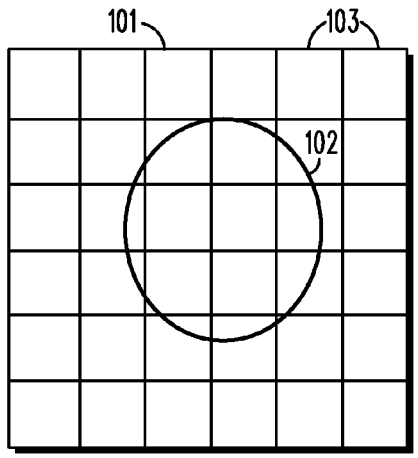
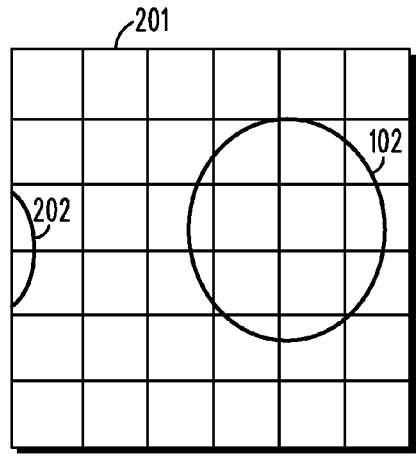
FIG. 1          FIG. 2
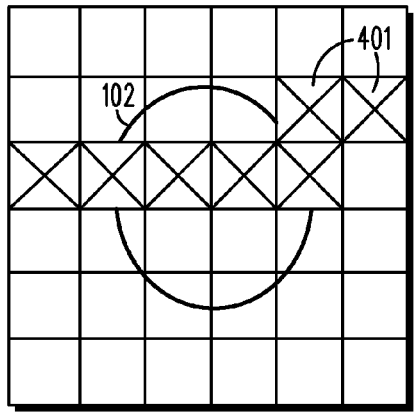
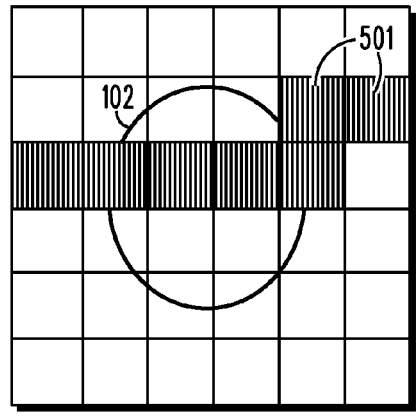
FIG. 4          FIG. 5
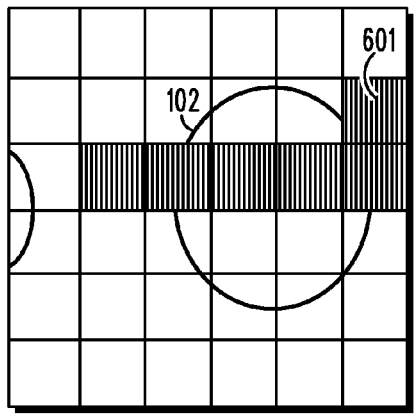
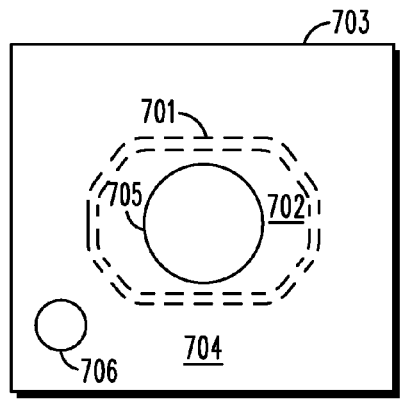
FIG. 6          FIG. 7

METHOD AND APPARATUS TO FACILITATE CREATING ANCILLARY INFORMATION REGARDING ERRORED IMAGE CONTENT

TECHNICAL FIELD

This invention relates generally to the processing of image content and more particularly to the processing of image content that contains errors.

BACKGROUND

The capture and storage of images using digital techniques comprises a well understood area of endeavor. This holds true for both still images and video images. Such digital content can require considerable storage and/or transmission resources. As a result, the encoding of such image content in order to consume reduced storage/transmission resources also comprises a well understood area of practice. Various discrete cosine transformation-based encoding approaches exist, for example, to achieve such results.

In many such approaches, source video frames are divided and encoded as a series of rectangular macroblocks. When subsequently decoded, the pixels as correspond to these macroblocks are typically derived either from discrete cosine transform-encoded texture data (often known as Intra-encoding) or from a combination of motion compensation information as applied to previously decoded pixels coupled with a residual discrete cosine transform-encoded texture data (which may be either, for example, Inter or predictive encoding).

Such a hybrid encoding scheme can reliably produce a reasonably accurate reconstruction of the original source video frame. In many cases, in fact, the reconstruction process is perfectly defined by a corresponding standard (in the sense that every decoder complying with a given compression standard will reproduce the same pixel-for-pixel output when fed a same compressed bitstream input). When dealing with errored input, however, the decoding process can introduce ambiguity. This occurs in substantial part due to a lack of standardization regarding the handling of errored content (which comprises, for example, corrupted and/or missing pixel information).

For many application purposes, such ambiguity does not necessarily present a problem. It simply means that different decoder designers and manufacturers have an opportunity to differentiate their offerings from one another in this regard, often to the benefit of the consumer. The applicant has determined, however, that there are other application settings when such ambiguity comprises an undesired circumstance. Public safety application settings, for example, do not necessarily benefit from a portrayal of ambiguous image content. Tactical decision making will benefit more, for example, from understanding what is assuredly real in a given image and what is potentially suspect. The same may hold true when seeking to instantiate the evidentiary value of a given image for use in a courtroom. The applicant has therefore recognized and determined that present ambiguity introduced by today's image decoding processes when processing errored image content can accordingly be viewed as being distinctly unhelpful in such application settings.

BRIEF DESCRIPTION OF THE DRAWINGS

The accompanying figures, where like reference numerals refer to identical or functionally similar elements throughout the separate views, which together with the detailed description below are incorporated in and form part of the specification, and serve to further illustrate various embodiments of concepts that include the claimed invention, and to explain various principles and advantages of those embodiments.

FIG. 1 comprises a view of image content as configured in accordance with various embodiments.

FIG. 2 comprises a view of subsequent image content as configured in accordance with various embodiments FIG. 3 comprises a flow diagram as configured in accordance with various embodiments FIG. 4 comprises a view of errored image content as configured in accordance with various embodiments FIG. 5 comprises a view of a display of errored image content as configured in accordance with various embodiments FIG. 6 comprises a view of a subsequent display of errored image content as configured in accordance with various embodiments FIG. 7 comprises a view of a display of image content as configured in accordance with various embodiments FIG. 8 comprises a block diagram view as configured in accordance with various embodiments.

Figure 3:
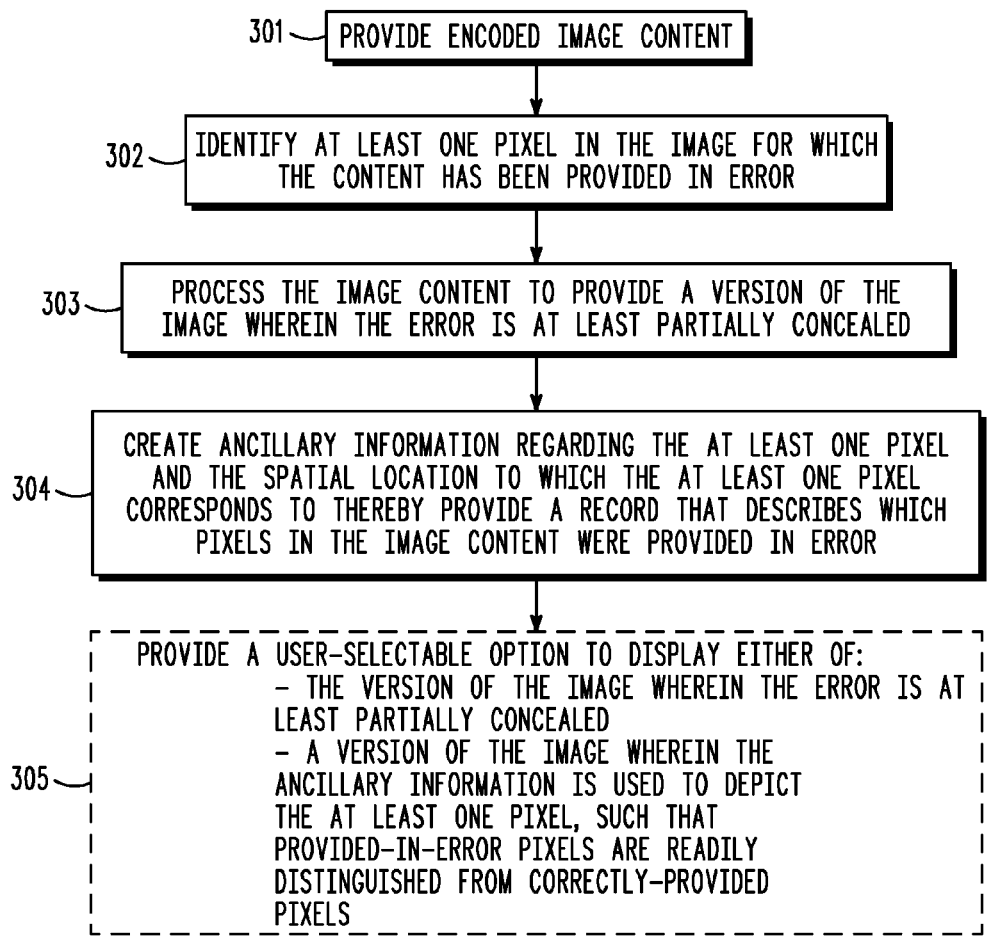

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to these various embodiments, one provides encoded image content and then identifies one or more pixels in the image for which the content has been provided in error. This leads to processing the image content to provide a version of the image wherein the error is at least partially concealed while also creating ancillary information regarding the errored pixel(s) and the spatial location to which such pixel(s) corresponds to thereby provide a record that describes which pixels in the image content were provided in error. These teachings will then further support, for example, providing a user-selectable option to display either the aforementioned corrected version of the image wherein the error is at least partially concealed and/or a version of the image wherein the ancillary information is used to depict the errored pixel(s) such that provided-in-error pixels are readily distinguished from correctly-provided pixels.

These teachings will readily accommodate both still image and video image application settings. When used with video image content, these teachings can be applied in conjunction both with Intra-encoded image content as well as motion compensation encoded image content.

So configured and arranged, these teachings permit a viewer to have the ability to readily discern those portions of an image-based presentation that are accurate and those that are not. This, of course, does not necessarily lead to an aesthetically pleasing rendering as often results (and is the intended end result) of an error-concealment approach. This does, however, assure the viewer that what is viewable is accurate and can therefore be used with a higher level of confidence as a foundation for tactical decision-making, evidentiary showings, and so forth. Those skilled in the art will recognize and appreciate that these teachings are readily and easily implemented in a cost-effective and reliable manner.

These and other benefits may become clearer upon making a thorough review and study of the following detailed description. Referring now to the drawings, and in particular to FIG. 1, it may be helpful to first briefly describe and characterize an illustrative content with which these teachings may be practiced. Those skilled in the art will recognize and understand that this example is intended to serve only in an illustrative capacity and is not intended to comprise an exhaustive listing of all possibilities in this regard.

In this example, a given image 101 (comprising, at least in part, a circle 102) is comprised of a plurality of macroblocks 103 where each macroblock comprises a plurality of corresponding pixels. This image 101 may comprise, for example, a first frame of a video sequence. In such an example, each macroblock may be comprised of Intra-encoded image content. To continue with this example, FIG. 2 can be viewed as comprising an image 201 that comprises a next frame in the aforementioned video sequence. In this illustrative example, the circle 102 has moved a bit to the right while a new object 202 has begun to appear at the left. Such an image 201 can be represented in part through motion compensation information (to represent, for example, the previously encoded circle 102 which has moved slightly to the right) and partly through new Intra-encoded content where necessary, for example, to facilitate rendering the new object 202.

In accordance with well understand prior art technique, such images are readily and reliably decoded and rendered when the corresponding encoded information has been received fully intact for each of the noted macroblocks and their corresponding pixels. As noted above, the present teachings are primarily intended to address the circumstance that arises when such encoded content becomes subjected to error-inducing circumstances.

Referring now to FIG. 3, a corresponding process 300 will be presented. This process 300 provides for provision 301 of encoded image content. As noted, this can comprise providing still images and/or encoded video content as desired. The encoding itself can comprise, but is not limited to, discrete cosine transform-based encoding as is well understood in the art. Those skilled in the art will recognize and appreciate that this step of providing 301 encoded image content can comprise, if desired, receiving the encoded image content via a wireless communication. Wireless communications, of course, are well understood to increase a likelihood that a given transmission of encoded image content will be compromised in some manner.

This process 300 then provides for identifying 302 at least one pixel in the image for which the content has been provided in error. As used herein, the notion of being provided in error will be understood to refer to corrupting the corresponding data (such that data is present but its accuracy is in doubt) in some manner and/or to simply losing the corresponding data. Those skilled in the art will recognize and appreciate that this can comprise pixel information as pertains to Intra-encoded portions of the image and/or information as pertains to motion compensated portions of the image.

With momentary reference to FIG. 4, as macroblocks are often sent in groups (with a given sequential grouping of such macroblocks being provided with a single corresponding data packet, for example), it can often be the case that a sequential plurality of such macroblocks will be identified as having been provided in error during such a step. Such a series of errored macroblocks are denoted by the X'ed-out macroblocks 401. It will be noted that these error-containing macroblocks 401 include image content areas that include a portion of the aforementioned circle 102.

Referring again to FIG. 3, this process 300 then provides for processing 303 the image content to provide a version of the image wherein the error is at least partially concealed. Numerous techniques are known in this regard with other approaches likely to be developed going forward. As used herein, this reference to concealing an error will be understood to refer to any mechanism that determines and substitutes pixel values in place of pixels that are decoded in error where those substitute pixel values are selected to at least attempt to serve as a compatible fit with the existing un-errored content. To illustrate this point, present day error correction techniques would likely be able to conceal the error conditions illustrated in FIG. 4 by effectively interpolating the missing pixel values to thereby achieve a resultant corrected image that looks, more or less, like that presented in FIG. 1.

In some application settings the intent may be to render such information usable in what amounts effectively to real time. In such a case, it may be wholly satisfactory to use the resultant version of the image in its present format. In other cases, however, and perhaps particularly when the information may be stored for some time for future use, it may be useful to convert (via, for example, a transcoding technique of choice) the resultant version of the image into a selected different digital format that may be better suited to long term storage, a particular intended playback platform, or the like. Accordingly, it will be understood that this step of processing 303 the image content to provide a version of the image wherein the error is at least partially concealed can comprise either retaining the image version in an original format or converting that resultant image into one or more other digital formats of choice.

In such a case as that provided in this simple illustration, this step of processing the image content to conceal the error is highly successful by one standard of measure in that the corrected image is highly similar to the original image. For many casual purposes, this comprises a highly desired result. As noted earlier, however, such concealment can prove highly mischievous when important decisions and judgments may depend upon the veracity of the resultant image. In such an application setting, the assumptions relied upon to make the required interpolations may in fact fool the observer into believing that things are different than they really are.

Accordingly, and referring again to FIG. 3, this process 300 also provides for creating 304 ancillary information regarding the at least one pixel and the spatial location to which the at least one pixel corresponds to thereby provide a record that describes which pixels in the image content were provided in error. By one approach, this comprises more than merely momentarily holding such information in a temporary buffer. Instead, a separate data file (or files) can serve to retain such information in a more permanent manner such that this information can be recalled minutes later, hours later, or even days, weeks, or years later when appropriate. As noted above, again, this ancillary information can either relate to the image data in an original format or can relate to the image data in a transcoded form of choice.

This information can then be used to provide a rendering of the corresponding image that represents the errored content in an unconcealed manner. By one approach, this can comprise representing such content using a corresponding single dedicated color (such as white, purple, red, or the like) 501 as illustrated in FIG. 5. In the illustrated example, the above-described identifying information regarding the pixels in the macroblocks 401 that were provided in error (as shown in FIG. 4) is used to locate the pixels that are to be colored as described and shown in FIG. 5. In some cases, it might be possible to display instead the actual corrupted and uncorrected content. For most application settings, however, it will likely be preferable to display such pixel locations using a display attribute that unmistakably and unambiguously characterizes that portion of the image as having been provided in error (by using, for example, a color that is not otherwise present in substantial quantity in the image). Such an approach can, in turn, provide comfort and assurances to a viewer with respect to the validity and accuracy of those portions of the image that are not so denoted.

As noted above, this process can be carried out both with Intra-encoded content as well as with motion compensated content. To aid in illustrating this point, in the illustrative example provided earlier the circle 102 has moved from the left to the right in the frame shown in FIG. 2. Given the error conditions presented by the example shown in FIG. 4, the motion compensation information will act to move macroblocks that were originally received in error as described above. In such a case, such motion compensation information can be similarly applied to effect movement of the described error-indicia 501 as shown in FIG. 5 to the new positions shown (601) in FIG. 6.

There are other ways by which error content can be distinctly noted. As but one example in this regard, and referring now to FIG. 7, a distinctive border 701 can encompass or otherwise highlight or indicate an area 702 within a given image 703 that is free of any errors (as versus other areas 704 that may be replete with such errors). Using this approach, for example, a viewer could readily, easily, and intuitively ascertain that the large circle 705 in the image 703 can be trusted whereas the smaller circle 706 may comprise untrustworthy image content.

Figure 8:
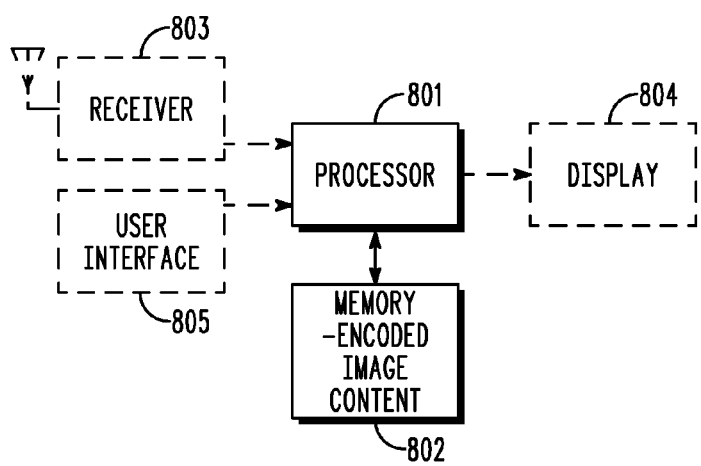

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 8, an illustrative approach to such a platform will now be provided.

In this illustrative example, apparatus 800 can comprise a processor 801 that operably couples to a memory 802 having encoded image content stored therein. Such content may be received, for example, as a wireless communication via an optional wireless receiver 803 that may also operably couple to the processor 801 (or, if desired, directly to the memory 802 itself).

The processor 801 can comprise a dedicated purpose platform or a partially or fully programmable platform. This processor 801 can be configured and arranged (via, for example, programming as will be well understood by those skilled in the art) to carry out one or more of the steps, activities, and/or functions described herein. This can include, for example, identifying image pixels for which the content has been provided in error, processing the image content to provide a version of the image wherein the error is at least partially concealed, and/or creating the ancillary information regarding such a pixel and the image content to which that pixel corresponds to thereby provide a record that describes which pixels in the image content were provided in error.

This apparatus 800 can optionally further comprise a display 804 of choice (such as, but not limited to, a full color liquid crystal display or the like) that also operably couples to the processor 801. So configured, this display 804 can serve to present the aforementioned corrected image content and/or an image that graphically indicates pixel content that has been provided with corresponding error(s).

Depending upon the requirements and/or the opportunities as tend to characterize a given application setting, the images displayed in this manner can either be in an original format or can comprise a transcoded version thereof. When using transcoding, those skilled in the art will recognize and understand that the image that graphically indicates pixel content that has been provided with corresponding error(s) can itself comprise an original image of this type that has been transcoded or an image that is formed from a transcoded version of the original image in view of the ancillary information as has also been transcoded as well.

Also if desired, this apparatus 800 can optionally comprise a user interface 805 that operably couples to the processor 801 and that is configured and arranged to provide a user with a selectable option to display either of the version of the image wherein the errors are at least partially concealed and the version of the image wherein the ancillary information is used to depict the errored pixels such that provided-in-error pixels are readily distinguished from correctly-provided pixels.

Those skilled in the art will recognize and understand that such an apparatus 800 may be comprised of a plurality of physically distinct elements as is suggested by the illustration shown in FIG. 8. It is also possible, however, to view this illustration as comprising a logical view, in which case one or more of these elements can be enabled and realized via a shared platform. It will also be understood that such a shared platform may comprise a wholly or at least partially programmable platform as are known in the art.

So configured and practiced, these teachings provide a simple and effective mechanism to aid in facilitating any decision-making and judgmental process that relies, in whole or in part, upon the veracity and accuracy of a given still or video image. In particular, these teachings provide an intuitive mechanism to permit a viewer to readily discern those portions of an image that can be trusted as well as those portions of an image that have been received in error.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus to facilitate creating ancillary information regarding errored image content described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
    providing encoded image content;
    identifying, as errored content, at least one pixel in the image for which the image content has been decoded in error;
    processing the image content to substitute corresponding pixel values in place of the errored content to provide a version of the image comprising a resultant corrected image wherein the errored content is at least partially concealed; and
    creating ancillary information regarding the at least one pixel and the spatial location to which the at least one pixel corresponds to thereby provide a record that describes which pixels in the image content were decoded in error and substituted with the corresponding pixel values while processing the image content.

2. The method of claim 1 wherein providing encoded image content comprises, at least in part, receiving the encoded image content via a wireless communication.

3. The method of claim 1 wherein providing encoded image content comprises providing encoded video content.

4. The method of claim 3 wherein identifying at least one pixel in the image for which the image content has been decoded in error comprises identifying at least one pixel in an Intra-encoded portion of the image for which the image content has been decoded in error.

5. The method of claim 3 wherein identifying at least one pixel in the image for which the content has been decoded in error comprises identifying at least one pixel that was originally decoded in error and which is now being displaced by a motion compensation encoding technique.

6. The method of claim 1 further comprising:
    providing a user-selectable option to display either of:
        the version of the image wherein the errored content is at least partially concealed;
        a version of the image wherein the ancillary information is used to depict the at least one pixel, such that decoded-in-error pixels are distinguished from correctly-decoded pixels.

7. The method of claim 6 wherein providing a user-selectable display of the version of the image wherein the errored content is at least partially concealed comprises providing a user discernable indicator that the error exists.

8. The method of claim 1 wherein:
    processing the image content to provide a version of the image wherein the errored content is at least partially concealed further comprises, at least in part, converting the version of the image into a selected different digital format; and
    creating ancillary information regarding the at least one pixel and the spatial location to which the at least one pixel corresponds to thereby provide a record that describes which pixels in the image content were decoded in error further comprises, at least in part, converting the ancillary information into a form that is compatible with the selected different digital format.

9. An apparatus comprising:
a memory having encoded image content stored therein;
a processor in communication with to the memory and being configured and arranged to:
identify, as errored content, at least one pixel in the image for which the image content has been decoded in error;
process the image content to substitute corresponding pixel values in place of the errored content to provide a version of the image comprising a resultant corrected image wherein the errored content is at least partially concealed; and
create ancillary information regarding the at least one pixel and the image content to which the at least one pixel corresponds to thereby provide a record that describes which pixels in the image content were decoded in error and substituted with the corresponding pixel values while processing the image content.

10. The apparatus of claim 9 wherein the processor is further configured and arranged to provide encoded image content by, at least in part, receiving the encoded image content via a wireless communication.

11. The apparatus of claim 9 wherein the processor is further configured and arranged to provide encoded image content by providing encoded video content.

12. The apparatus of claim 11 wherein the processor is further configured and arranged to identify at least one pixel in the image for which the image content has been decoded in error by identifying at least one pixel in an Intra-encoded portion of the image for which the content has been decoded in error.

13. The apparatus of claim 12 wherein the processor is further configured and arranged to identify at least one pixel in the image for which the image content has been decoded in error by identifying at least one pixel that was originally decoded in error and which is now being displaced by a motion compensation encoding technique.

14. The apparatus of claim 9 further comprising:
a user interface configured and arranged to provide a selectable option to display either of:
the version of the image wherein the errored content is at least partially concealed; and
a version of the image wherein the ancillary information is used to depict the at least one pixel, such that decoded-in-error pixels are distinguished from correctly-decoded pixels.

15. The apparatus of claim 14 wherein the user-selectable display of the version of the image wherein the errored content is at least partially concealed further comprises a user discernable indicator that the error exists.

16. The apparatus of claim 9 wherein the processor if further configured and arranged to:
process the image content to provide a version of the image wherein the errored content is at least partially concealed by, at least in part, converting the version of the image into a selected different digital format; and
create ancillary information regarding the at least one pixel and the spatial location to which the at least one pixel corresponds to thereby provide a record that describes which pixels in the image content were decoded in error by, at least in part, converting the ancillary information into a form that is compatible with the selected different digital format.

* * * * *